Jan. 3, 1939.   C. S. ROBBINS   2,142,457
HEADLIGHT MECHANISM
Filed Oct. 4, 1937   2 Sheets-Sheet 1
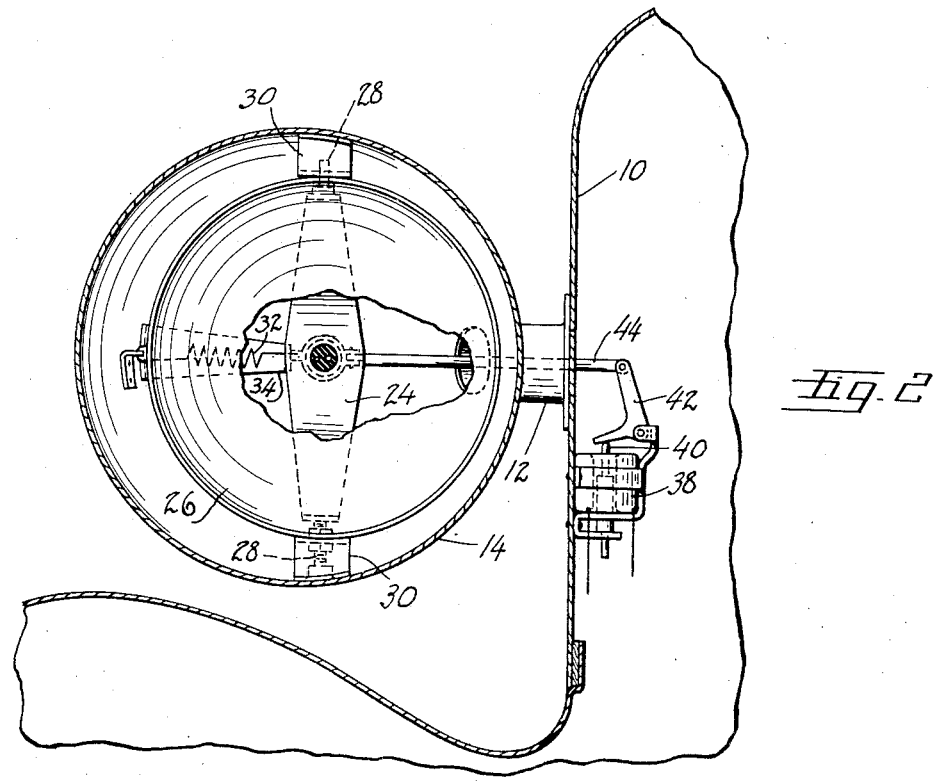
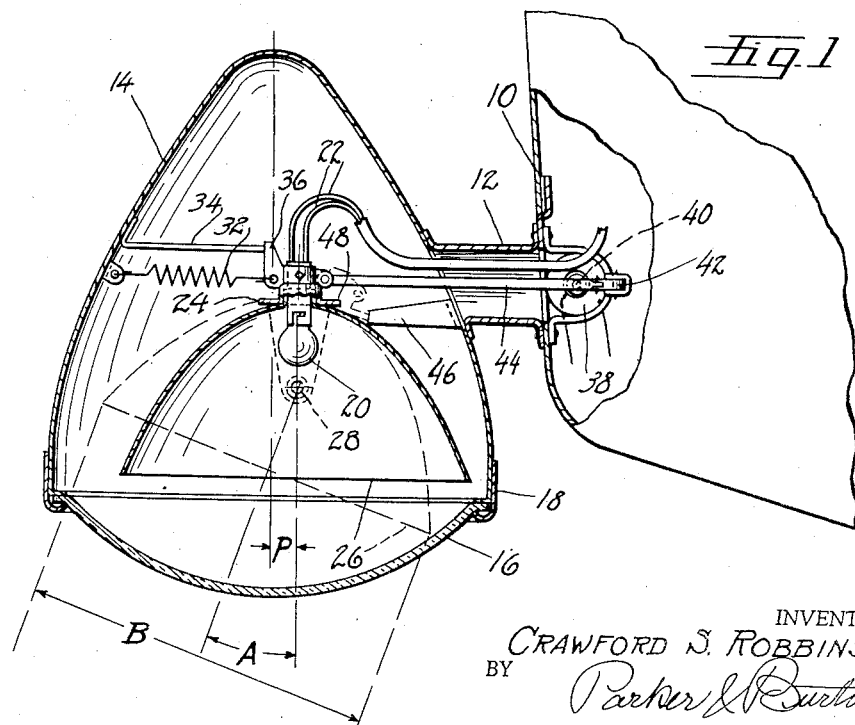
INVENTOR.
CRAWFORD S. ROBBINS
BY Parker & Burton
ATTORNEY.

Jan. 3, 1939. C. S. ROBBINS 2,142,457
HEADLIGHT MECHANISM
Filed Oct. 4, 1937 2 Sheets-Sheet 2
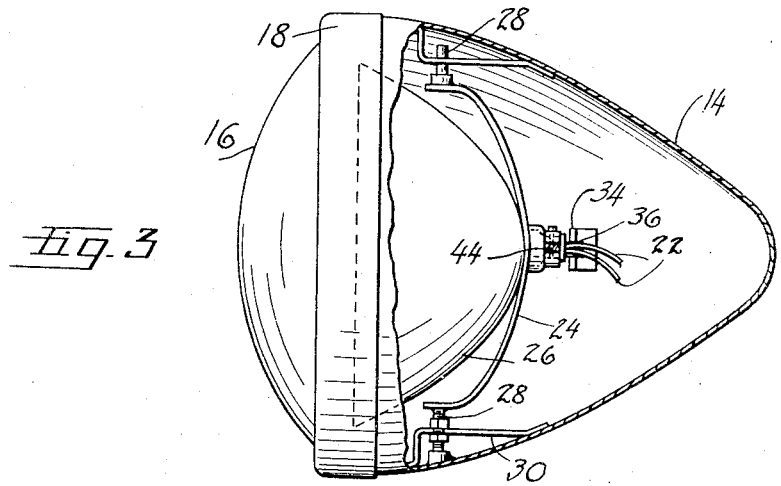
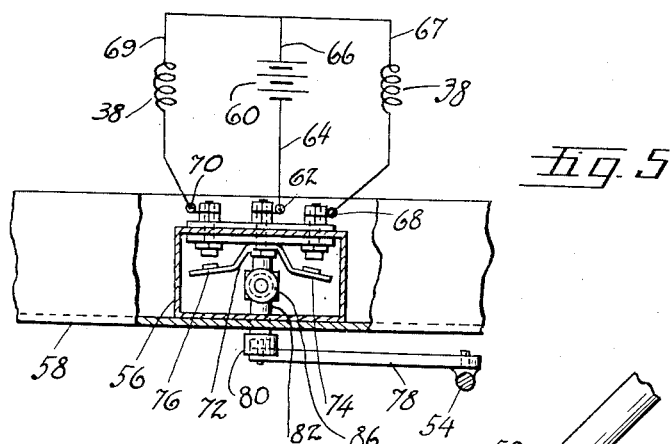
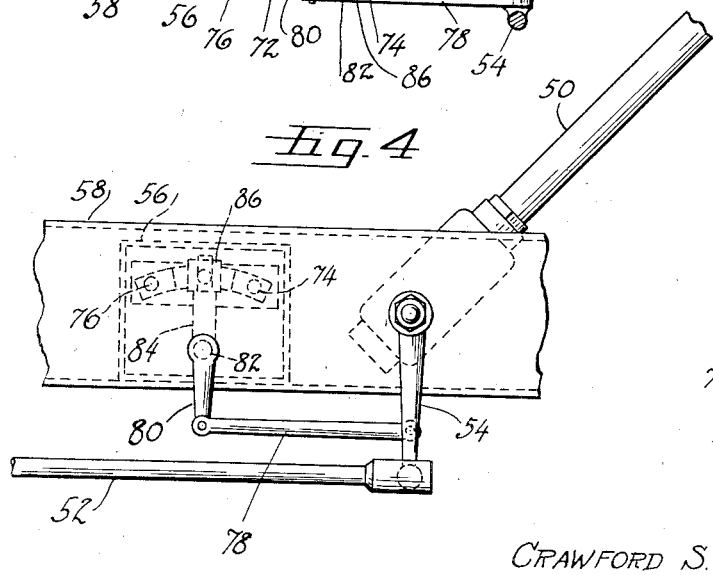
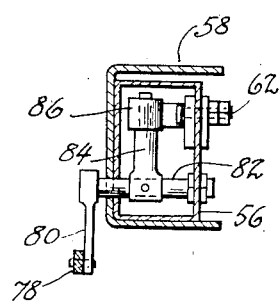
INVENTOR.
CRAWFORD S. ROBBINS
BY
Parker & Burton
ATTORNEYS.

Patented Jan. 3, 1939

2,142,457

UNITED STATES PATENT OFFICE 2,142,457

HEADLIGHT MECHANISM

Crawford S. Robbins, Detroit, Mich.

Application October 4, 1937, Serial No. 167,089

3 Claims. (Cl. 240—8.25)

This invention relates to improvements in dirigible headlight mechanism for vehicles. It is particularly adapted for, and is shown as embodied in, headlight mechanism for motor vehicles.

An object of this invention is to provide simple, inexpensive, sturdy headlight mechanism of the character described which is adapted to illuminate the road ahead of the vehicle as the vehicle is steered around a curve.

One object of the invention is to provide mechanism of this type so constructed that the roadway around the curve toward which the vehicle is moving is illuminated and, in addition, the path directly in front of the vehicle is likewise illuminated. Vehicles of this type are commonly provided with a pair of headlights being a right headlight and a left headlight. My improved construction is such that as the vehicle is turned to the right the light rays from the right headlight are swung to the right to illuminate the road toward which the vehicle is turning, and the light rays from the left headlight remain in the straight ahead position. When the vehicle is swung to the left the light rays from the left headlight are swung to illuminate the curve about which the vehicle is turning and the rays from the right headlight are directed straight ahead.

In carrying out this invention it is particularly important that the light rays which are swung about the curve include all the rays of light directed from such headlight. To accomplish this the structure is of such a character that when the light rays of either headlight are swung outwardly all the rays of such headlight are directed out through the headlight lens.

In the accomplishment of the immediately aforementioned object a meritorious feature of the construction is that the light beam directing mechanism which is supported within the headlight casing for swingable movement is pivotally supported off center the centerline of the headlight casing and toward the centerline of the vehicle.

In the carrying out of my invention various types of operating mechanism, mechanical, fluid control, or electric control, might be employed, but in the embodiment illustrated in the drawings electric control mechanism is shown.

Other objects, advantages, and meritorious features of my invention will more fully appear from the following specification, appended claims, and accompanying drawings, wherein:

Figure 1 is a plan view of a fragment of a front of an automobile showing one headlight assembly embodying my invention in cross section, Fig. 2 is a front elevation partly in section through the headlight assembly shown in Fig. 1, Fig. 3 is a side elevation partly broken away of the headlight assembly shown in Figs. 1 and 2, Fig. 4 is an elevation of a fragment of the steering apparatus and control switch, Fig. 5 is a plan partly broken away of the structure shown in Fig. 4 and illustrating the electric circuit in diagram, and Fig. 6 is a section through the switch structure shown in Figs. 4 and 5 on a vertical line and showing part of the actuating mechanism in elevation.

The invention is shown as applied to an automobile to which it is particularly adapted for application. The automobile is a conventional structure and the hood is indicated at 10. It is common practice to have right and left headlights associated with the hood on opposite sides thereof. These headlights may be supported in any suitable fashion. One method is to provide a tubular support 12 extending from the hood to the headlight casing 14. My invention is adaptable to any type of headlight casing and support therefor. It is merely illustrated in this form which is in common use. The right headlight assembly and the left headlight assembly are the same and only one is here illustrated. It is understood that the same description applies to the other.

Each assembly comprises the casing 14 aforementioned and the lens 16 which may be held in place by retaining ring 18 or by any other suitable means. Within the casing is swingably supported the beam directing mechanism. This beam directing mechanism comprises a light bulb 20 and leads 22 extending therefrom to a suitable source of electric supply such as a battery, not shown, but which is conventional. The bulb is carried by a bracket or frame 24 and a reflector 26 surrounds the bulb and is likewise carried by the bracket 24.

This bracket is mounted to swing about a vertical pivot. This pivot is here shown as formed by pivot extensions 28 at opposite ends of the bracket. These extensions 28 are received within supports 30 secured to opposite sides of the headlight casing. It will be noted from Figs. 2 and 3 that the pivotal support of this bracket is off center the centerline of the headlight casing and toward the centerline of the vehicle which is for a purpose hereinafter more fully described.

A spring 32 serves to normally center this beam directing assembly. There is a stop 34 within the headlight casing and a part 36 carried by the bracket and the functioning is as shown in Fig. 1 so that the spring will only pull the assembly to the point of contact of the part 36 with the stop 34. In this position the reflector directs its beams straight ahead.

To swing this beam directing mechanism so that the reflector occupies the dotted line position shown in Fig. 1 electrical operating means is provided. It is understood that any suitable type of operating means might be employed but the one here shown comprises a solenoid structure 38 which is here shown as supported on the inner wall of the hood 10. The solenoid plunger 40 actuates a crank 42 which in turn pulls a link 44, which link is connected at one end to the crank and at the opposite end to the bracket 24.

When the solenoid plunger moves upwardly it will be seen that the link 44 will move inwardly toward the centerline of the vehicle and swing the reflector and light bulb to the position shown in dotted line in Fig. 1. In such position there is a stop 46 within the headlight casing which is engaged by a part 48 on the swingable bracket to determine the angle of swing of the reflector. This angle of swing is such that all the light rays thrown outwardly by the reflector are passed through the headlight lens. Such method of functioning is induced by the offset pivot mounting of the reflector as heretofore described.

In the drawings Figs. 1 and 2 show the right head lamp and illustrate how the beam directing mechanism is swung to throw the light rays to the right. It is to be understood that the left head lamp is of a similar construction and is so constructed that the beam of light is thrown to the left. The beam directing mechanism of each headlight has two positions. In one position the light beam is directed straight ahead. In the other position it is directed outwardly away from the centerline of the vehicle.

The control means for this dirigible action of the headlight beam directing mechanisms is associated with the steering apparatus of the vehicle. In Fig. 4 the steering column is indicated as 50. There is a drag link 52 coupled through a steering arm 54 with the steering mechanism which is of a conventional construction. I provide a switch structure shown in Figs. 4, 5, and 6 which includes the switch box 56 that may be secured to a side frame member 58 of a vehicle. Within this switch box is a switch having three permitted positions. This switch is hooked up with the electric system of the car. Diagrammatically the battery is shown at 60. A lead 64 extends from contact 62 of the switch to the battery. A lead 66 extends from the battery through one line 67 to a contact 68 in the switch and through another line 69 to the contact 70 of the switch. The switch includes a movable contact member 72, which movable contact element has a contact point 74 adapted to engage the contact element 68 within the switch and a contact part 76 adapted to engage contact 70 within the switch.

To actuate this movable contact member 72 in response to steering movement of the steering mechanism I provide a link 78 connected with the steering arm 54 at one end and with a lever 80 at the opposite end. This lever is mounted upon a shaft 82. This shaft when rotated rocks a lever 84. This lever 84 carries a part 86 which swings the contact element 72 either to make a circuit through the contacts 74 and 68 or through the contacts 70 and 76 or to break both circuits as is shown in Fig. 5. The circuit formed through the contacts 74, 68 and lead 67 from the battery include the solenoid structure associated with one of the headlights. The circuit formed through the contacts 76, 70 and line 69 from the battery includes a solenoid structure associated with the other head lamp. Energization of either solenoid swings the beam directing mechanism of the head lamp with which such solenoid is associated. It is apparent that both solenoids could not be energized at the same time and that as the vehicle steers in one direction one solenoid is energized and as the vehicle is steered in the other direction another solenoid is energized.

The operation therefore will be that as the vehicle is steered to the right the right headlight is swung to the right while the beam of the left headlamp continues to project in the straight ahead position. When the vehicle is swung to the left the beam directing mechanism of the left headlamp is swung to direct the beam therefrom to the left while the beam from the right headlamp continues to follow the straight ahead position.

What I claim is:

1. In a vehicle having steering apparatus and having a right headlight assembly and a left headlight assembly, each headlight assembly including a stationary casing and provided with light beam directing mechanism swingably supported within the casing, a spring associated with the swingably supported light beam directing mechanism of each headlight assembly adapted to normally yieldingly hold said light beam directing mechanism to direct the beams straight ahead, the swingably supported light beam directing mechanism of the right headlight assembly being pivoted within its casing offset to the left of the centerline of the casing and supported for swinging movement only in the direction to direct the headlight beam thereof to the right of the straight ahead position, the swingably supported light beam directing mechanism of the left headlight assembly being pivoted within its casing offset to the right of the centerline of the casing and supported for swinging movement only in the direction to direct the headlight beam thereof to the left of the straight ahead position, electrical operating means associated with the swingably supported light beam directing mechanism of the right headlight assembly adapted to swing the same against the resistance of its spring and in a direction to direct the beam to the right of a straight ahead position only, electrical operating means associated with the swingably supported light beam directing mechanism of the left headlight assembly adapted to swing the same against the resistance of its spring and in a direction to direct the beam to the left of the straight ahead position only, means limiting the complete swing of each headlight beam directing mechanism, and electrical control means coupled with the steering apparatus and with the operating means associated with each headlight assembly responsive to energizing only the operating means associated with the right headlight assembly when the vehicle is turned to the right and responsive to energizing only the operating means associated with the left headlight assembly when the vehicle is turned to the left, the electrically responsive operating means coupled with each swingably supported headlight beam directing mechanism being operable upon electrical energization to immediately swing the headlight beam directing mechanism through its complete permitted arc of swing.

2. In a vehicle having steering apparatus and having a right headlight assembly and a left headlight assembly, each headlight assembly including a casing provided with a headlight lens and light beam directing mechanism swingably supported within the casing upon a pivot offset the centerline of the casing and toward the centerline of the vehicle, each light beam directing mechanism including a reflector swingably supported upon said pivot, means normally supporting each reflector to direct its headlight beam straight ahead yieldable in the case of the right headlight reflector to permit said reflector to be swung only to direct its beam to the right of the straight ahead position and yieldable in the case of the left headlight reflector to permit said reflector to be swung only to direct its beam to the left of the straight ahead position, and means cooperating with each headlight beam directing mechanism operable in the case of the right headlight reflector to limit its complete swing in the swinging of the headlight beam to the right whereby in the completely swung position of said reflector substantially all the light rays directed therefrom will be thrown out of the casing surrounding the reflector and operable in the case of the left headlight reflector to limit its complete swing whereby at the completely swung position of said reflector substantially all the light rays directed therefrom will be thrown out of the casing surrounding said reflector, operating means responsive to movement of the steering apparatus in steering the vehicle to the right to swing the reflector of the right headlight assembly only and in a direction to direct the beam therefrom to the right, said operating means responsive to movement of the steering apparatus in steering the vehicle to the left to swing the reflector of the left headlight assembly only and in a direction to direct the beam therefrom to the left.

3. In a vehicle having steering apparatus and having a right headlight assembly and a left headlight assembly, each headlight assembly including a casing and light beam directing mechanism swingably supported within the casing, a solenoid associated with each light beam directing mechanism to swing the same, electrical control means associated with the steering apparatus and with said solenoids and responsive to movement of the steering apparatus to steer the vehicle to the right to energize the solenoid associated with the right headlight assembly only to swing the light beam directing mechanism thereof to direct the light beam to the right of the straight ahead position, said control means responsive to movement of the steering apparatus to steer the vehicle to the left to energize the solenoid associated with the left headlight assembly only to swing the light beam directing mechanism thereof to direct the light beam to the left of the straight ahead position, a spring coupled with each swingable light beam directing mechanism adapted to yieldingly hold the same to direct the light beam straight ahead, a stop limiting the swing of each light beam directing mechanism from the straight ahead position, the swingable light beam directing mechanism of the right head light assembly being pivoted offset to the left of the centerline of the headlight casing and the swingable light beam directing mechanism of the left head light assembly being pivoted offset to the right of the centerline of the head light casing.

CRAWFORD S. ROBBINS.